(12) United States Patent
Clifford

(10) Patent No.: US 9,067,536 B2
(45) Date of Patent: Jun. 30, 2015

(54) LED WHIP LIGHT ASSEMBLY

(71) Applicant: Checkers Industrial Products, LLC, Broomfield, CO (US)

(72) Inventor: Scott Clifford, Mesa, AZ (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 0 days.

(21) Appl. No.: 14/328,977

(22) Filed: Jul. 11, 2014

(65) Prior Publication Data
US 2014/0317916 A1 Oct. 30, 2014

Related U.S. Application Data

(62) Division of application No. 13/797,061, filed on Mar. 12, 2013.

(60) Provisional application No. 61/704,260, filed on Sep. 21, 2012.

(51) Int. Cl.
| | | |
|---|---|---|
| H01J 9/00 | (2006.01) |
| B60Q 1/26 | (2006.01) |
| F21V 5/04 | (2006.01) |
| F21V 17/08 | (2006.01) |
| F21S 8/10 | (2006.01) |
| F21V 23/04 | (2006.01) |
| F21W 101/02 | (2006.01) |
| F21Y 101/02 | (2006.01) |

(52) U.S. Cl.
CPC ............ *B60Q 1/2657* (2013.01); *F21V 5/04* (2013.01); *F21V 17/08* (2013.01); *Y10T 29/49117* (2015.01); *F21V 23/0442* (2013.01); *F21W 2101/02* (2013.01); *F21Y 2101/02* (2013.01); *F21S 48/211* (2013.01); *F21S 48/215* (2013.01); *F21S 48/2206* (2013.01); *F21S 48/33* (2013.01)

(58) Field of Classification Search
CPC .. B60Q 1/2657; F21S 48/211; F21S 48/2206; F21S 48/33; F21S 48/215; F21V 5/04; F21V 17/08
See application file for complete search history.

(56) References Cited

U.S. PATENT DOCUMENTS

| 5,031,827 A | 7/1991 | von Braunhut |
|---|---|---|
| 2014/0126193 A1 | 5/2014 | Dixon et al. |

*Primary Examiner* — Joseph L Williams
(74) *Attorney, Agent, or Firm* — Holland & Hart

(57) ABSTRACT

A light emitting diode (LED) whip light assembly includes a base and an LED light assembly. The base is configured to mount to an elongate whip rod. The LED light assembly is mounted to the base and includes a plurality of LED lights, an LED circuit, and a lens. The LED circuit includes a circuit board to which the plurality of LED lights are mounted. The lens is mounted to the base with a releasable, liquid-tight connection and covers the plurality of LED lights.

5 Claims, 16 Drawing Sheets

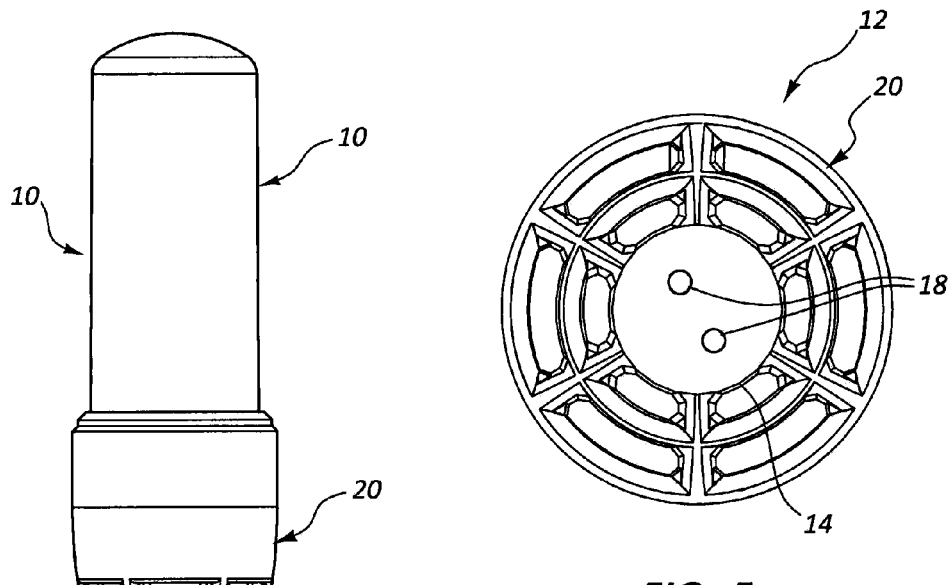
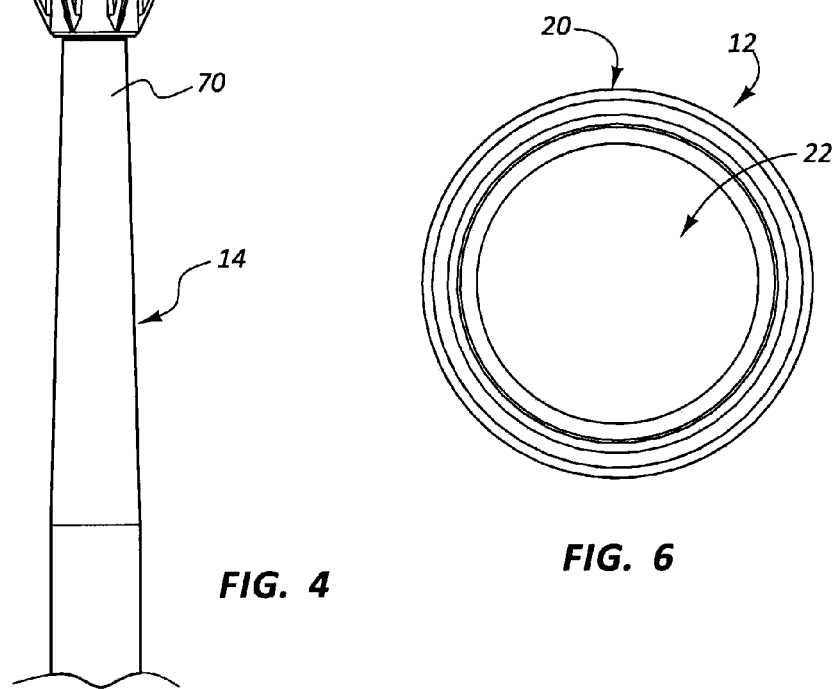
FIG. 4　　FIG. 5　　FIG. 6

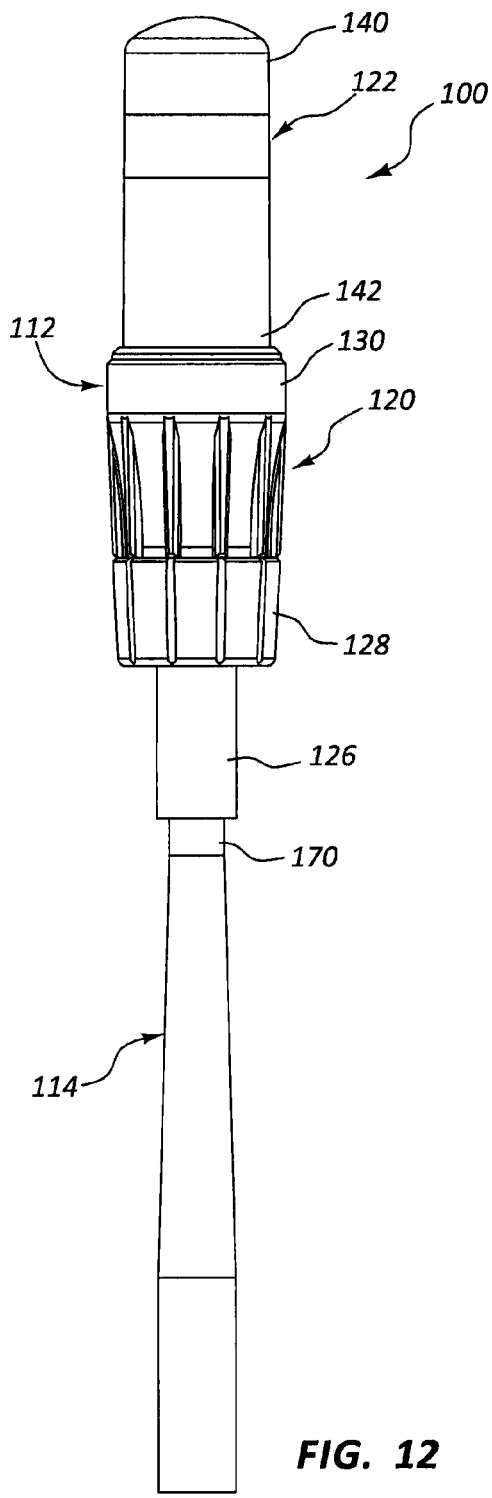
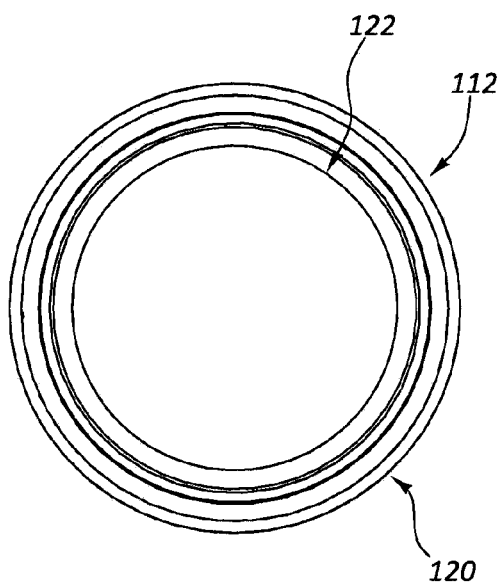
FIG. 13
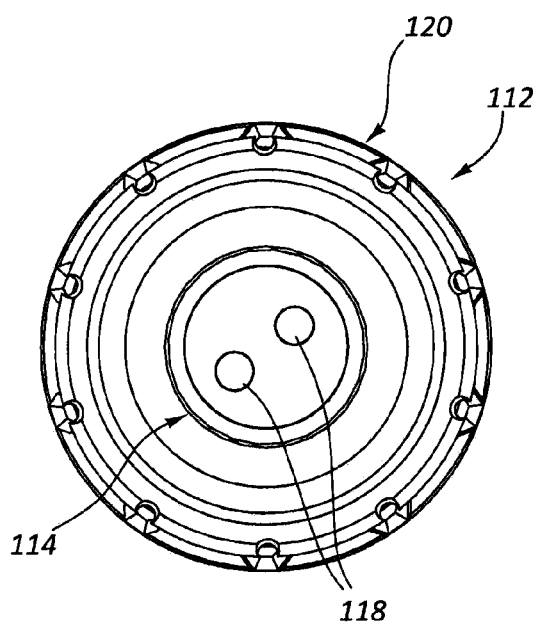
FIG. 14
FIG. 12

LED WHIP LIGHT ASSEMBLY

RELATED APPLICATIONS

This is a divisional of U.S. patent application Ser. No. 13/797,061 filed on 12 Mar. 2013, now pending, which claims the benefit of U.S. Provisional Application No. 61/704,260, filed 21 Sep. 2012, the disclosures of which are incorporated, in their entireties, by this reference.

BACKGROUND

The use of warning whips to increase visibility of vehicles is well known. A warning whip typically includes an elongate rod that extends vertically upward from a vehicle. A free end of the rod may include a visual enhancement feature such as a flag or light. An opposite end of the whip is connected to the vehicle with a mounting bracket. The whip may include a connector feature for securing the whip to the mounting bracket. Wiring may extend through the connector and the elongate rod to the free end of the warning whip to provide power to the light.

One common type of warning whip light is an industry standard 1156 light fixture with bulb and associated socket. An 1156 light fixture has been used in the past for stop, turn and tail lights on a vehicle. The 1156 bulb includes a connector end that has a cylindrical shape. An end surface includes a protruding tip that provides a hot wire connection to the bulb. An outer surface of the connector end includes two nipples protruding radially outward that are used to provide a ground connection and secure the bulb to the socket. The bulb is advanced into the socket with the nipples extending through a pair of axially aligned tracks. The bulb is then rotated a quarter turn to position the nipples in horizontal portions of the tracks to lock the bulb in the socket.

The connection between the 1156 bulb and associated socket may be susceptible to failure, especially under severe vibration and impact forces. Sleeves have been used over the outside of the socket to help better secure the bulb to the socket. Set screws have also been used with the sleeve to provide additional positive connection. However, even with these additional connection features, an 1156 light fixture typically still has a number of shortcomings that make it undesirable for use with a warning whip.

Opportunities exist for providing improved lights for warning whips.

SUMMARY

As will be described in greater detail below, one aspect of the present disclosure relates to a light emitting diode (LED) whip light assembly that includes a base and an LED light assembly. The base is configured to mount to an elongate whip rod. The LED light assembly is mounted to the base and includes a plurality of LED lights, an LED circuit, and a lens. The LED circuit includes a circuit board to which the plurality of LED lights are mounted. The lens is mounted to the base with a releasable, liquid-tight connection and covers the plurality of LED lights.

The base may include a first portion mounted directly to the elongate whip rod with a liquid-tight connection, and a second portion connected to the LED light assembly and lens, and releasably connected to the first portion with a liquid-tight connection. The first portion may be an 1156 base socket. The lens may be mounted to the base with a threaded connection. The LED circuit may include a programmable controller. The LED circuit may include an ambient light sensor.

The plurality of LED lights may include optics providing a limited light angle in at least the vertical direction. The LED light assembly may be releasably mounted to the base to provide replacement of the LED light assembly. The plurality of LED lights may be positioned on opposite sides of the circuit board.

Another aspect of the present disclosure relates to a waterproof LED whip light assembly that includes a base, an LED light assembly, and a lens. The base is configured to connect directly to an elongate whip rod with a liquid-tight connection. The LED light assembly is mounted to the base and includes a plurality of LED lights and control circuitry. The LED light assembly may be replaceable. The lens covers the plurality of LED lights and is mounted to the base with a liquid-tight connection.

The plurality of LED lights may include 2, 4 or 6 LED lights. The LED light assembly may include a plug power connector configured to releasably mount to a power receiver of the base. The control circuitry may be operable to control at least one of light intensity and on/off state of the plurality of LED lights.

A further aspect of the present disclosure relates to a lighted warning whip that includes an elongate rod, a base, an LED light assembly, and a lens. The elongate rod has a proximal end configured for mounting the lighted warning whip to a vehicle, and a free distal end. The base is mounted to the distal end of the elongate rod. The LED light assembly is mounted to the base with a releasable connection and includes a controller, an ambient light sensor, and a plurality of LED lights mounted to a printed circuit board. The controller is operable to control output of the plurality of LED lights in response to feedback from the ambient light sensor. The lens covers the LED light assembly and is releasably connected to the base.

The controller may be operable to control at least one of light intensity and an on/off state of the plurality of LED lights. The lens may be connected to the base with a liquid-tight connection. The base may be connected to the elongate rod with a liquid-tight connection. The controller may include a 12-24 Volt microprocessor controlled Buck converter.

Another aspect of the present disclosure relates to an LED light for a whip light assembly. The LED light includes at least two 1 Watt LED lights each having an output of at least 100 lumens. Each LED light includes an optic providing a limited light output angle of no more than 90° in a vertical direction.

The at least two 1 Watt LED lights comprises two, four, or six 1 Watt LED lights. The optic may include a polymer encapsulation of each individual LED light. The output may be at least 130 lumens.

A further aspect of the present disclosure relates to an LED light assembly for a warning whip. The LED light includes at least two LED lights, an ambient light sensor, a programmable controller configured to control output of the at least two LED lights, and a pluggable power connector.

The LED light may also include a printed circuit board, wherein the at least two LED lights, the ambient light sensor, the programmable controller, and the pluggable power connector are connected to the printed circuit board. The controller may control output of the at least two LED lights based on output from the ambient light sensor.

Another aspect of the present disclosure relates to a method of assembling an LED whip light assembly. The method includes providing a base, an LED light assembly comprising a plurality of LED lights and control circuitry, and a lens. The method also includes connecting the base to an elongate whip rod with a liquid-tight connection, releasably connecting the LED light assembly to the base, covering the LED light assembly with the lens, and releasably connecting the lens to the base with a liquid-tight connection.

The base may include first and second portions, wherein the first portion is connected to the elongate whip rod with a liquid-tight connection, and the second portion is releasably connected to the first portion with a liquid-tight connection. Releasably connecting the lens to the base may include rotating the lens relative to the base. Releasably connecting the LED light assembly may include inserting at least one power prong of the LED light assembly into a power receiver of the base. Connecting the base to the elongate whip rod may include providing at least one of an interference fit connection, an adhesive bond connection, a weld connection, and a threaded connection.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a side view of the warning whip of FIG. 2.

FIG. 5 is a bottom view of the warning whip of FIG. 2.

FIG. 6 is a top view of the warning whip of FIG. 2.

FIG. 12 is a side view of the warning whip of FIG. 9.

FIG. 13 is a top view of the warning whip of FIG. 9.

FIG. 14 is a bottom view of the warning whip of FIG. 9.

Figure 1:
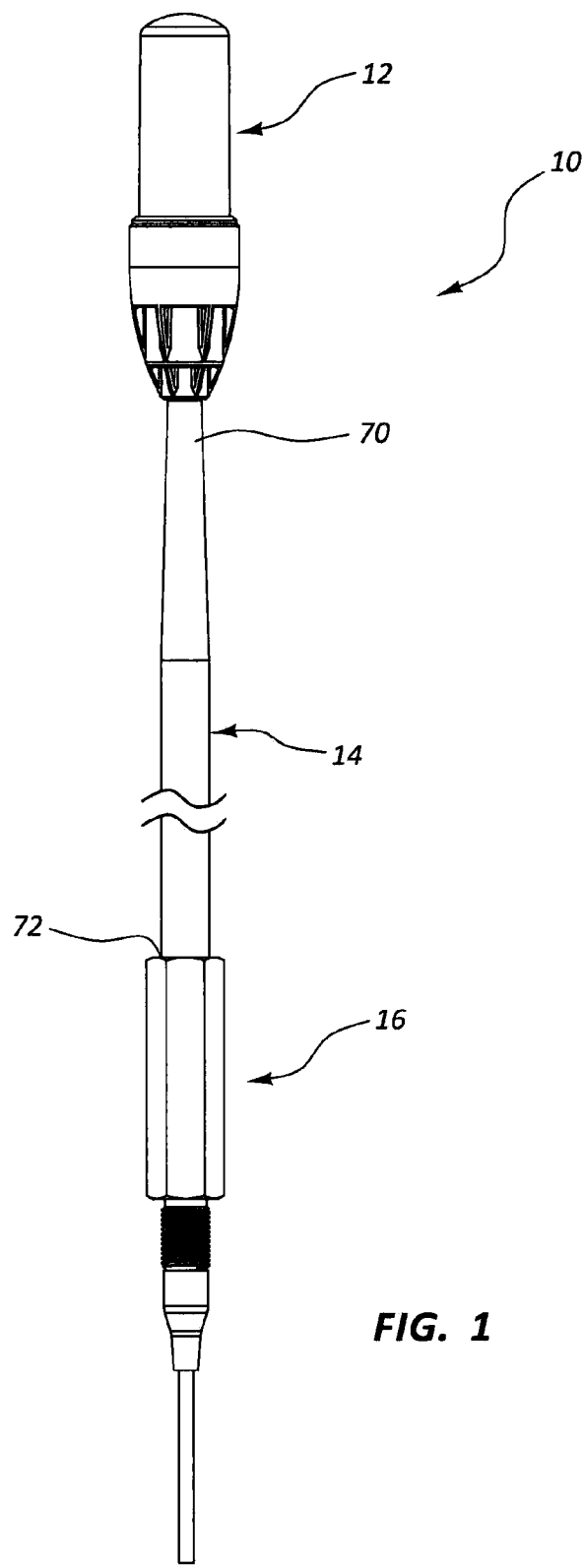
FIG. 1 is a side view of an example warning whip in accordance with the present disclosure.
Figure 2:
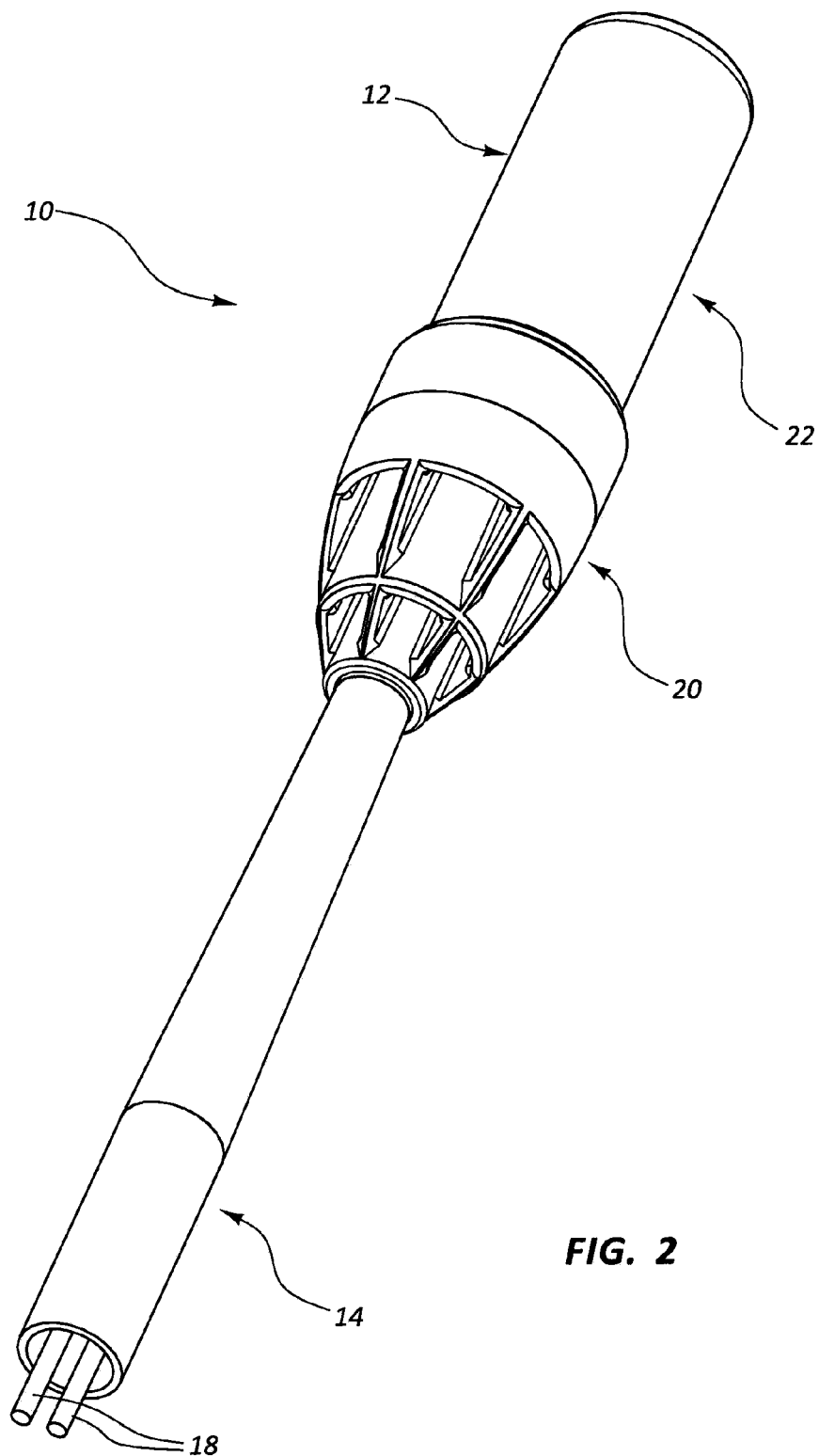
FIG. 2 is a perspective view of a distal portion of the warning whip of FIG. 1.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

As will be described in greater detail below, the present disclosure relates generally to warning whips, and more specifically relates to light systems for warning whips. The present disclosure particularly relates to light emitting diode (LED) light assemblies for warning whips.

One aspect of the present disclosure relates to a warning whip light having a base, a lens and an LED light assembly. The base is connected to a distal, free end of a whip rod of a warning whip. The lens is releasably connected to the base. The lens may have any of a variety of different colors. The LED light assembly is mounted to the base and positioned within the lens. The LED light assembly includes a plurality of LED lights that are connected to wiring that extends through the whip rod to a power source located remote from the warning whip. The LED lights may include an LED covered by optics. The optics may provide a narrowed light output angle at least in a vertical direction.

The LED whip light assembly may also include a controller and an ambient light sensor. The controller may control an intensity of light output from the LED lights based at least in part on output from the ambient light sensor, which relates to an ambient light condition.

The LED whip light assembly may be configured for mounting to an 1156 standard socket already mounted to the whip rod. The 1156 socket may be receptive of an 1156 bulb, and the 1156 bulb may be removed and replaced with the LED whip light assembly of the present disclosure. The LED whip light assembly may provide an improved connection with the 1156 socket to substantially eliminate the chance of removing the LED whip light assembly inadvertently or losing a ground connection with the 1156 socket.

In another embodiment, the LED whip light assembly may include separate connectors associated with the LED light assembly and the base that provide an improved connection of the LED whip light assembly to the whip rod and an improved connection between wiring of the warning whip to the LED whip light assembly. The improved connection with the wiring of the warning whip may substantially improve reliability of a ground connection with the wiring and eliminate disconnection of the hot wire from the LED whip light assembly.

Referring now to FIGS. 1-8B, an example warning whip 10 is shown including an LED whip light assembly 12, a whip rod 14, a base connector 16, and wiring 18. The LED whip light assembly 12 is connected to a distal end 70 of the whip rod 14. The base connector 16 is connected to a proximal end 72 of the whip rod 14. The wiring 18 extends through the base connector 16 and the whip rod 14 and into the LED whip light assembly 12 to provide power for operating the LED whip light assembly 12.

Figure 3:
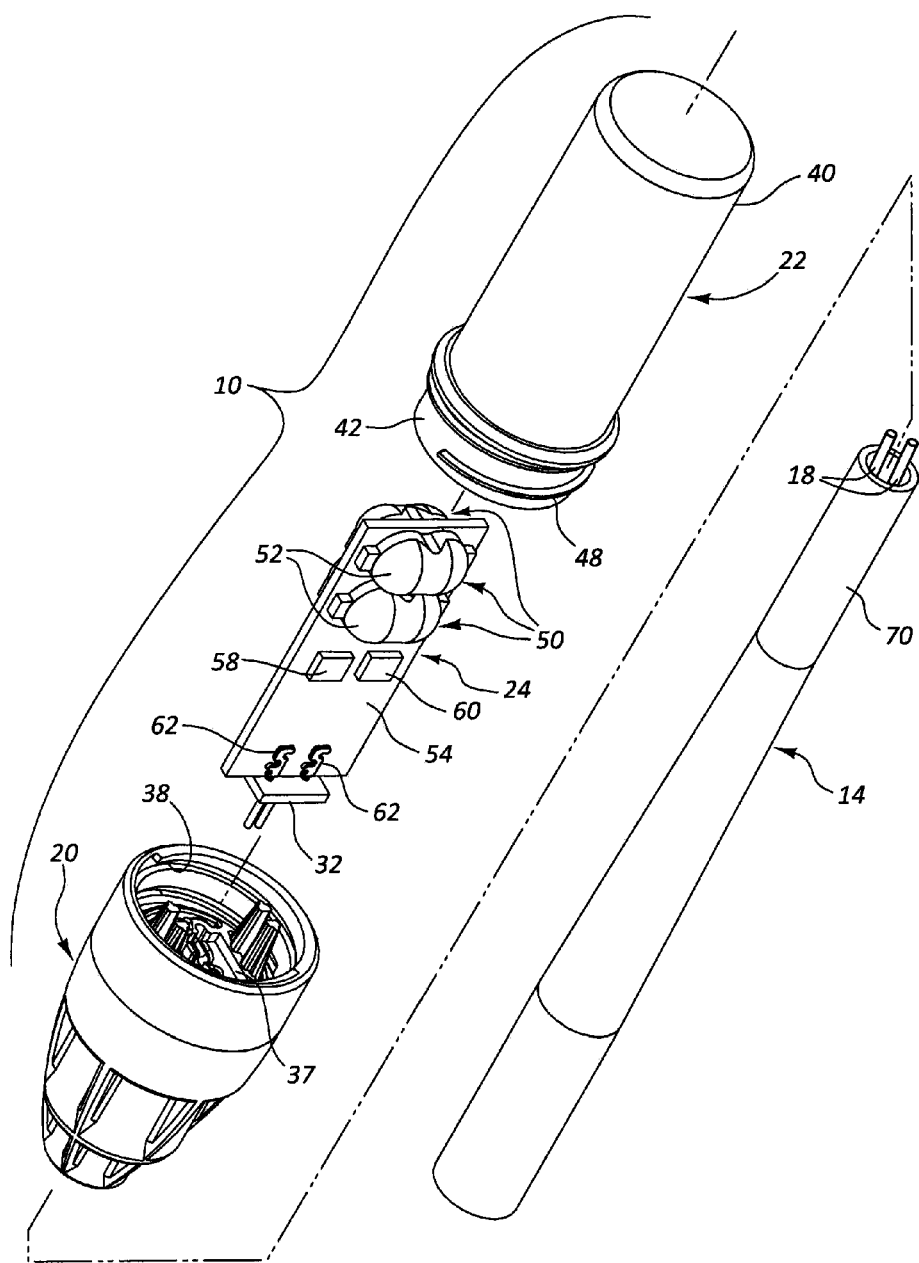
FIG. 3 is an exploded perspective view of the warning whip of FIG. 2.

Referring to FIG. 3, the LED whip light assembly includes a base 20, a lens 22, and an LED light assembly 24. The base 20 may be directly connected to the distal end 70 of the whip rod 14. The LED light assembly 24 releasably connects to the base 20. The lens 22 covers the LED light assembly 24 and releasably connects to the base 20. The connection between the lens 22 and base 20 may be liquid-tight so that the LED whip light assembly 12 is waterproof.

Referring to FIGS. 3 and 7A-8B, the base 20 includes an electrical connector assembly 32, a plurality of internal threads 38, and a rod connection feature 39. The electrical connector assembly 32 provides an electrical connection to the wiring 18 at one side thereof, and provides electrical connection to the LED light assembly 24 at an opposite side thereof. The electrical connector assembly 32 may include sockets that are receptive of connector probes of the LED light assembly 24. The electrical connector assembly 32 may include an electrical path for a ground wire and a separate electrical path for a hot wire.

The electrical connector assembly 32 may be releasably connected to base 20 in some embodiments. In other embodiments, the electrical connector assembly 32 is permanently mounted to the electrical connector assembly 32. FIG. 3 shows the electrical connector assembly 32 pre-mounted to the LED light assembly 24. During assembly of the warning whip 10, the base 20 is disconnected from the whip rod 14, and the wiring 18 extends through an aperture 37 to a location where the electrical connector assembly 32 may be connected to the wiring 18 using, for example, soldering. The LED light assembly 24 is then connected to the base 20 by inserting the electrical connector assembly 32 into the aperture 37. Thereafter, the LED light assembly 24 may be disconnected from and reconnected to the electrical connector assembly 32.

The threads 38 are positioned on an internal surface of the base 20 and configured to threadably mate with threads of the lens 22. The rod connector 39 may provide an interface between the base 20 and the whip rod 14. The rod connector 39 may provide an interference fit connection between the base 20 and whip rod 14. In at least some examples, an adhesive or other bonding agent is used to permanently fix the base 20 to the whip rod 14 at an interface between the rod connector 39 and the whip rod 14.

The lens 22 includes distal and proximal ends 40, 42, an internal cavity 44, a board connection portion 46, a plurality of threads 48, and a sealing member 49. The board connection portion 46 is positioned within the internal cavity 44 adjacent to the distal end 40. Threads 48 are positioned on an external surface of the lens 22 at the proximal end 42. The sealing member 49 may be positioned at the distal end 40, or, alternatively, may be mounted to the base 20 adjacent to the threads 38. The internal cavity 44 is sized to enclose the LED light assembly 24.

Other types of connection features besides threads 48 may be used to connect lens 22 to base 20. For example, a bayonet lock, a snap-fit connection, or interference fit connection may be used to secure lens 22 to base 20. The threads 48 may provide a releasable connection between lens 22 and base 20.

The LED light assembly 24 includes a plurality of LED lights 50, a printed circuit board 54, a controller 58, an ambient light sensor 60, and power connectors 62. The LED lights 50 may be positioned on opposing sides of the printed circuit board 54. Any desired number of LED lights 50 may be used. For example, a single LED light 50 may be positioned on each side of printed circuit board 54 to provide a 2 LED light configuration. Other examples include 2, 3, 4 or more LED lights on each side of the printed circuit board 54. The number of LED lights may be the same or different on each side of the printed circuit board 54. Similarly, the color, light intensity, and other properties of the LED lights may vary on one side of the printed circuit board or as compared to an opposite side of the printed circuit board.

Figure 7A:
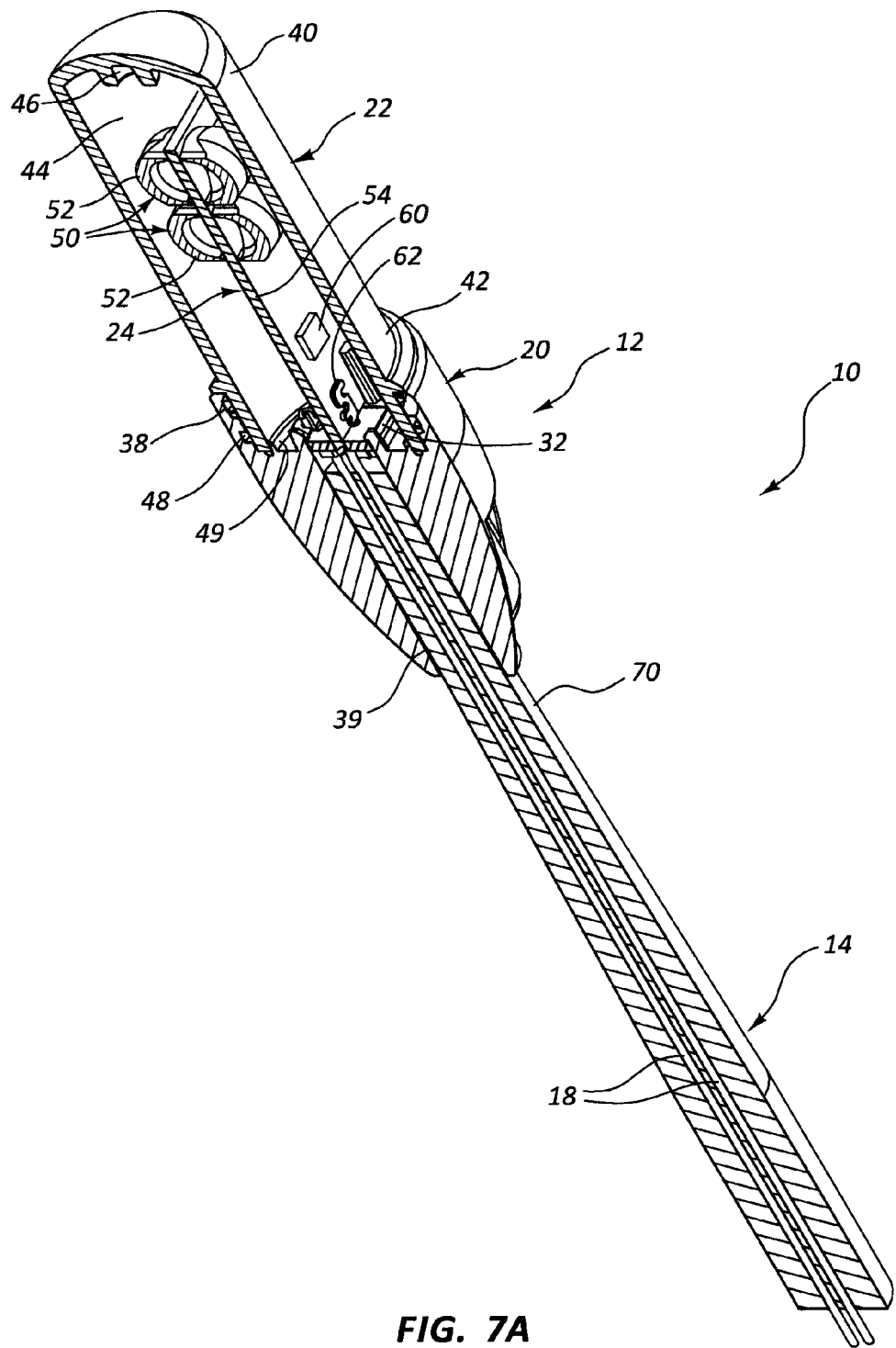
FIG. 7A is a perspective cross-sectional view of the warning whip of FIG. 2.
Figure 7B:
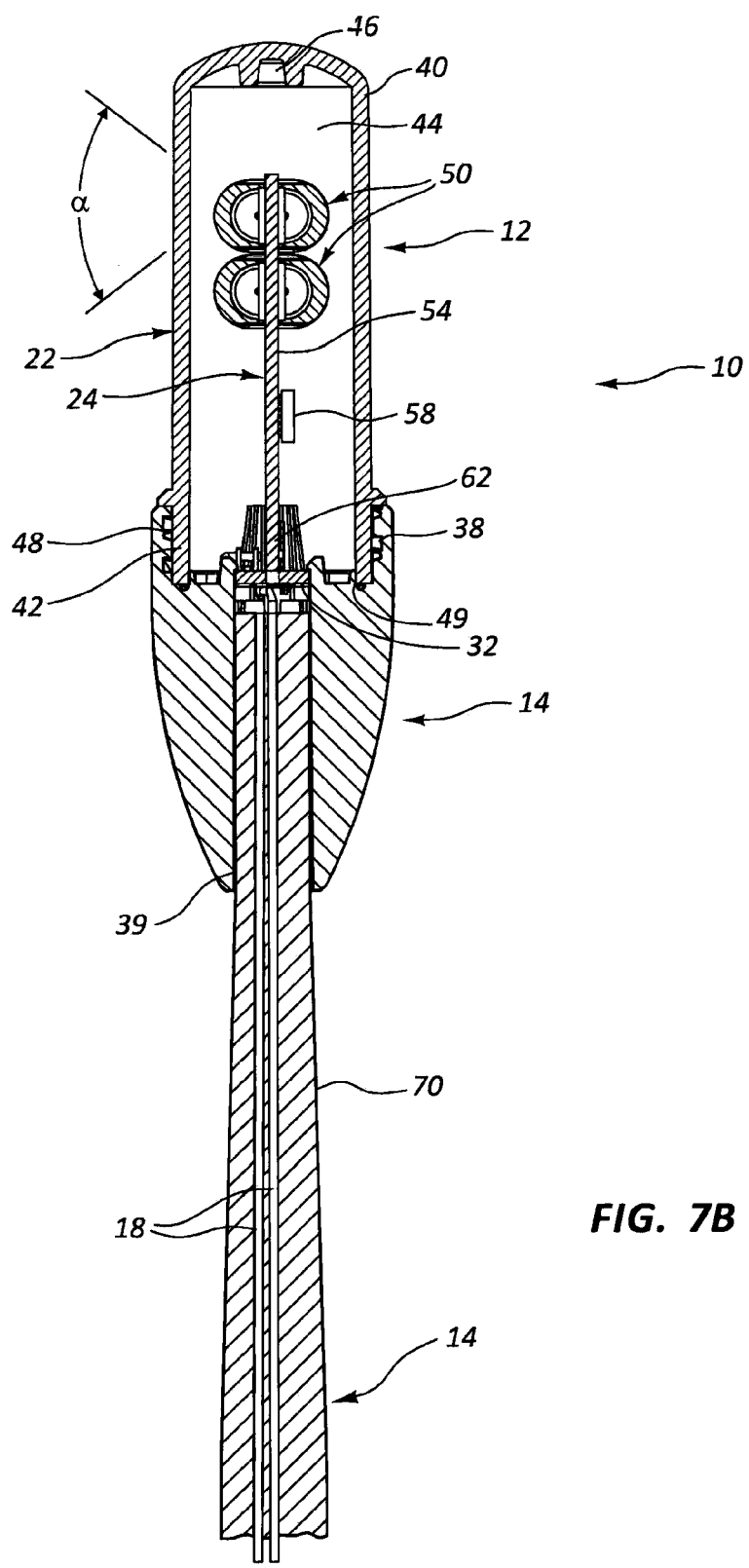
FIG. 7B is a plan view of the cross-section shown in FIG. 7A.
Figure 8A:
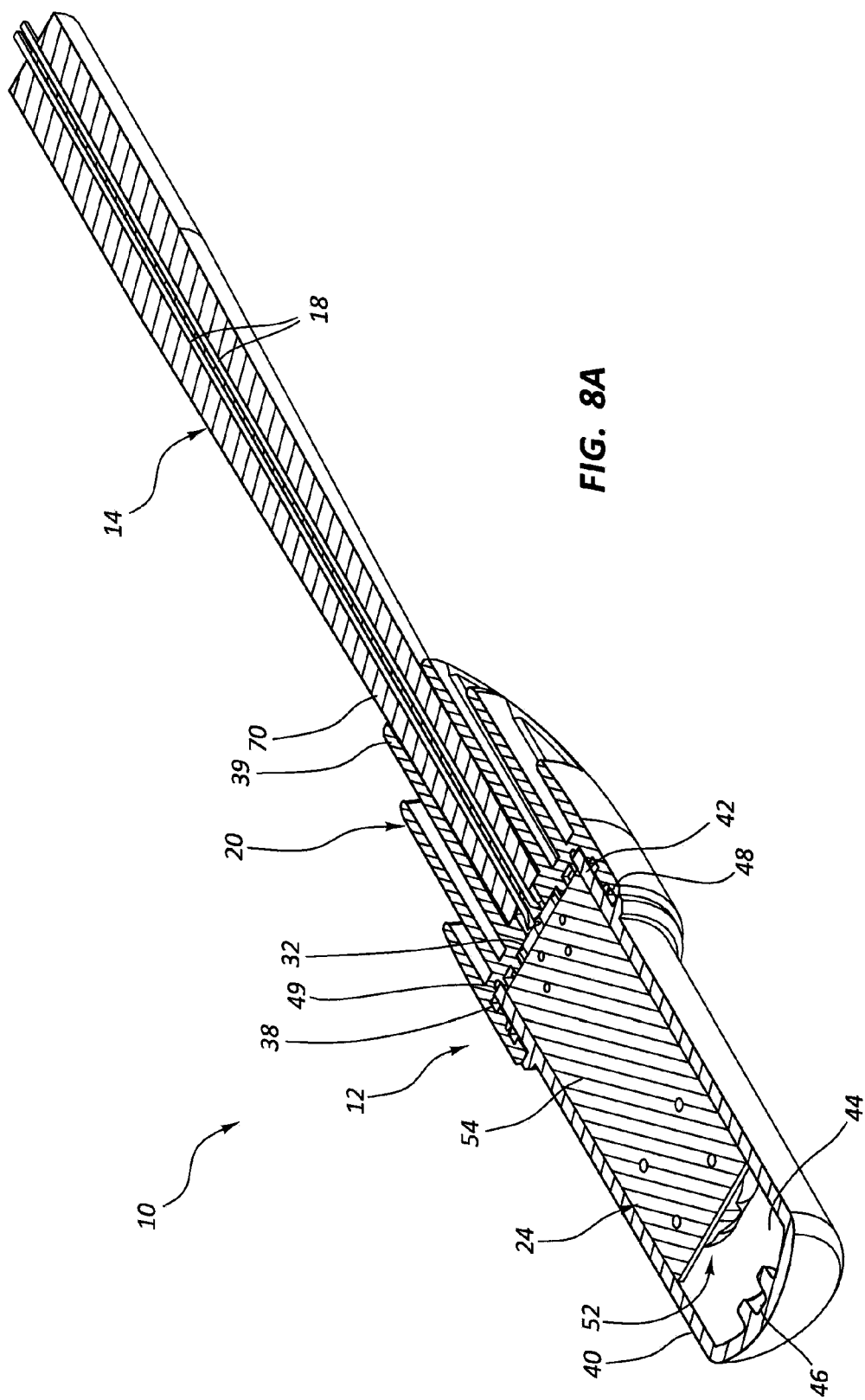
FIG. 8A is another perspective cross-sectional view of the warning whip of FIG. 2.
Figure 8B:
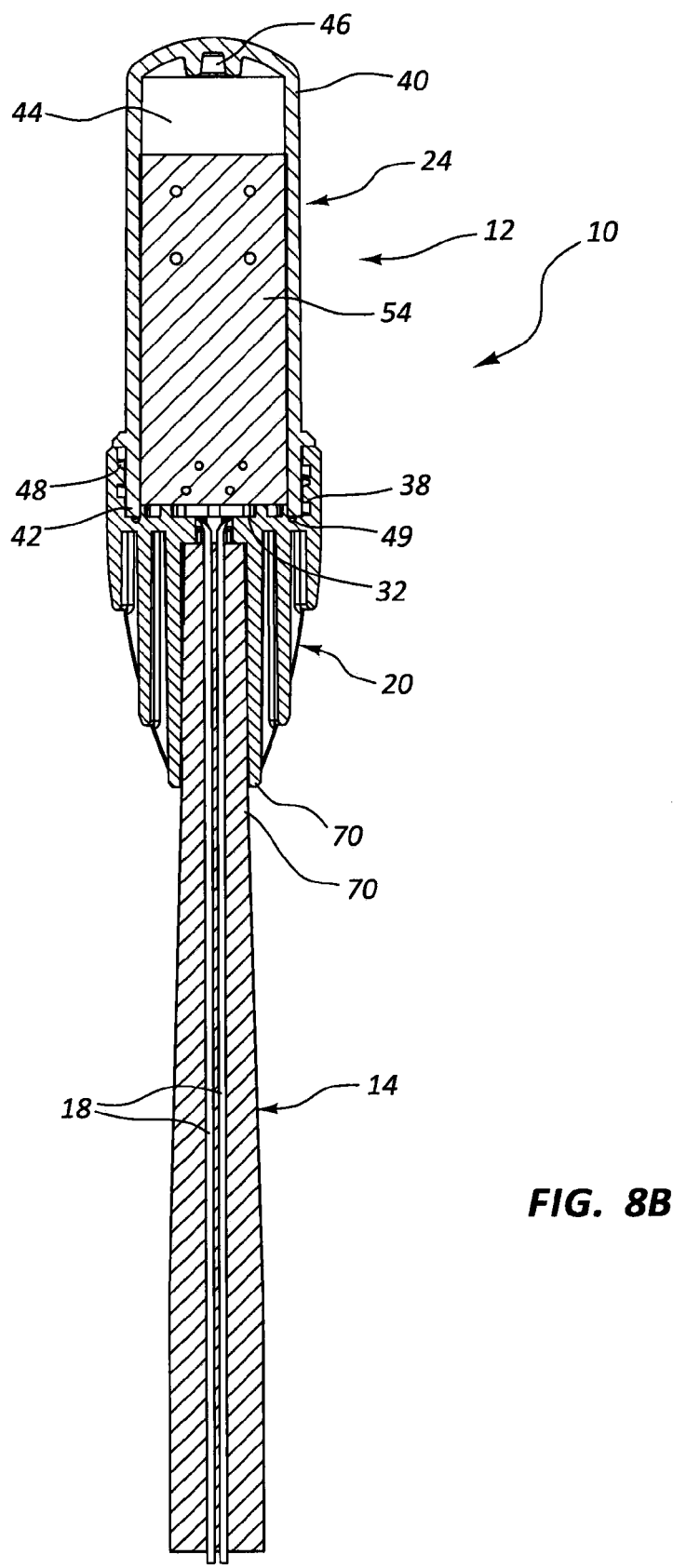
FIG. 8B is a plan view of the cross-section shown in FIG. 8A.
Figure 9:
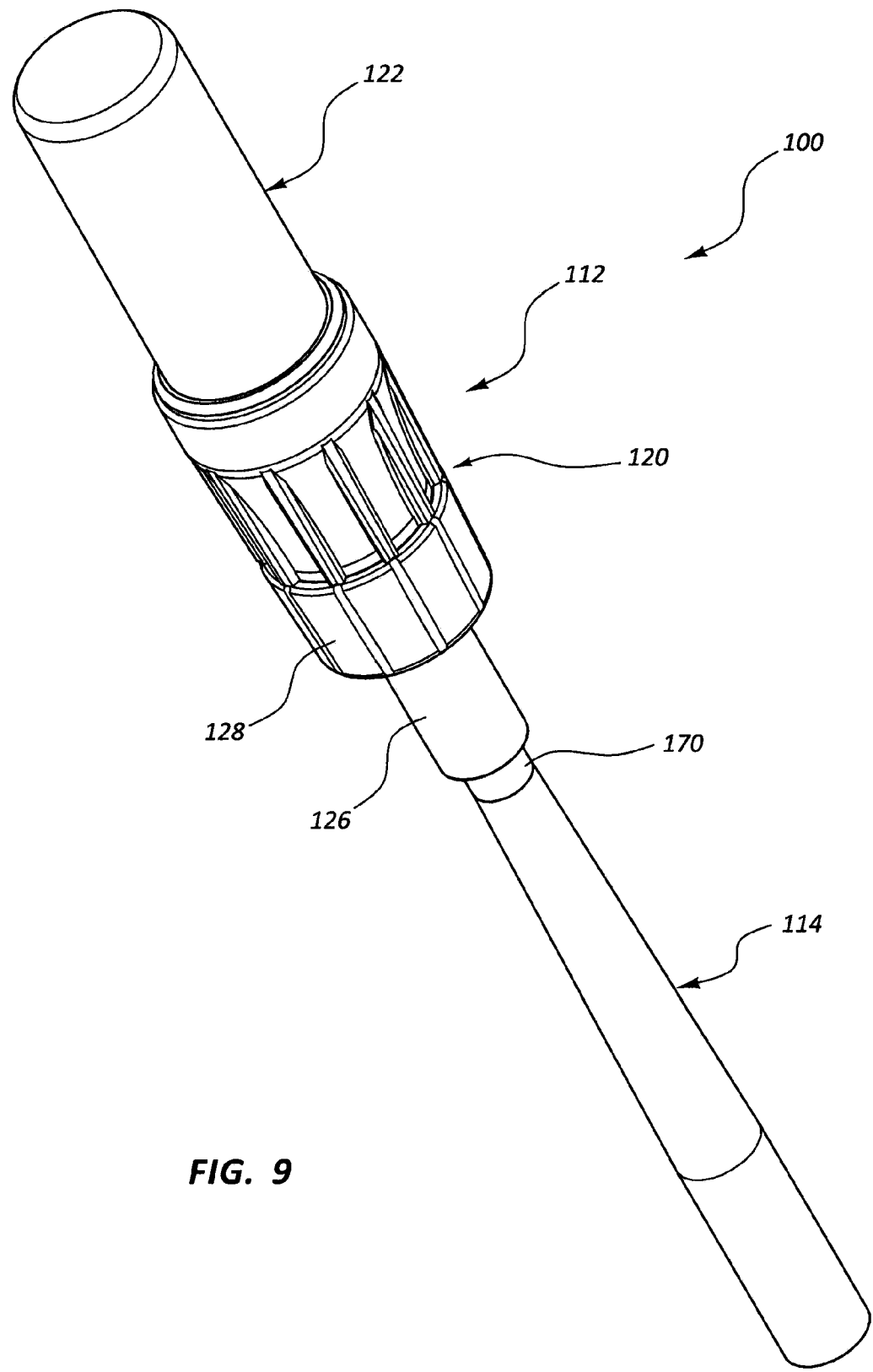
FIG. 9 is a perspective view of a distal end portion of another example warning whip in accordance with the present disclosure.
Figure 10:
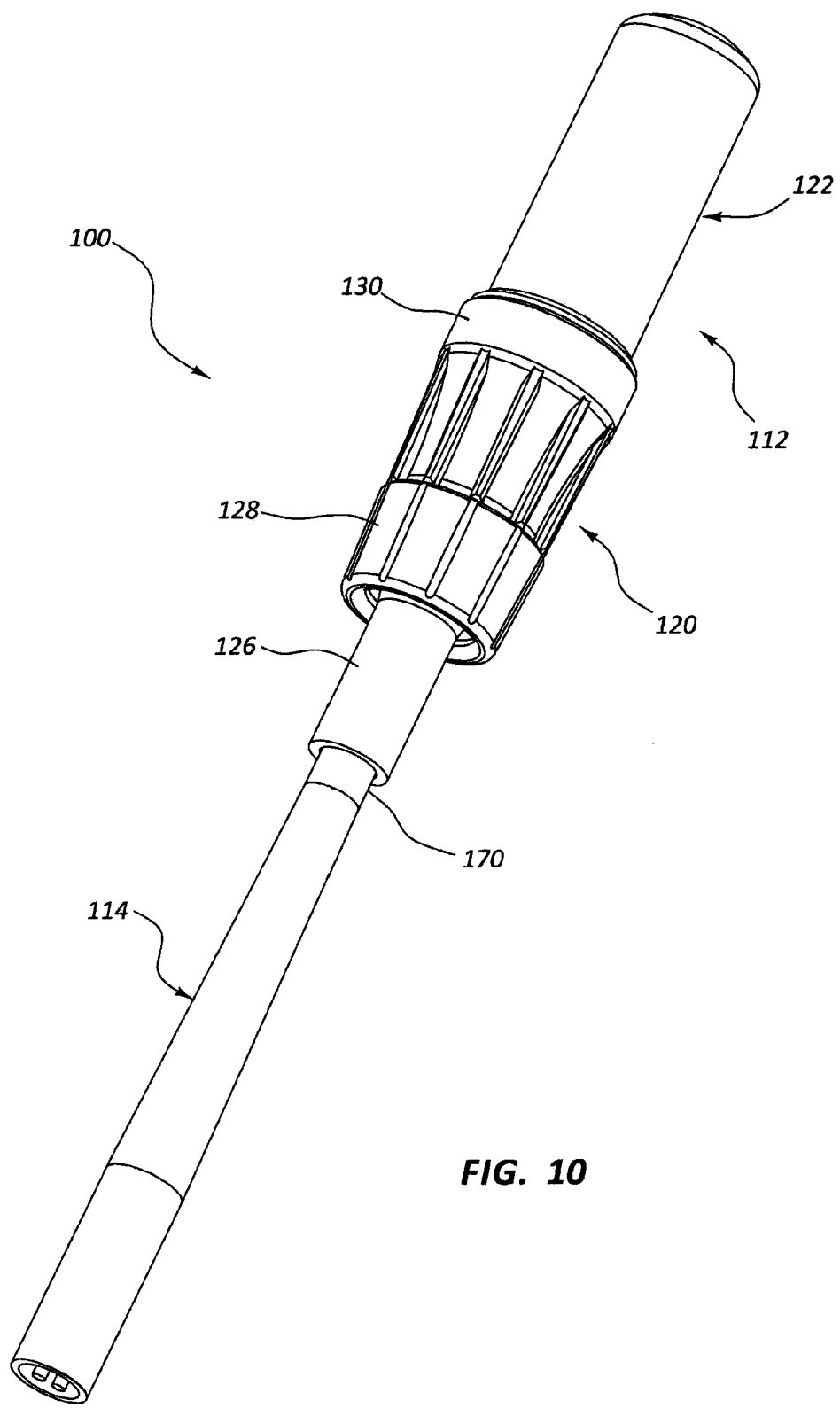
FIG. 10 is another perspective view of the warning whip of FIG. 9.

Each of the LED lights 50 includes optics 52, which surround or cover an LED. The optics 52 may provide a limited light path for light to exit the LED lights 50. FIG. 7B shows the optics 52 providing a reduced light angle α in a vertical direction. The angle α is typically less than 120°, and more preferably in the range of about 60° to about 90°. This reduced angle α may direct light from the LED lights 50 in a more horizontal direction, which is more likely to be seen by other vehicle operators in the area. The angle α may be different than an angle for light limited in a horizontal direction. The angle in the horizontal direction may be greater than the angle α, and is typically in the range of about 90° to about 180°, and more preferably about 120° to about 160°.

The controller 58 and ambient light sensor 60 may be mounted to the printed circuit board 54 along with other electronic components (not shown). The controller 58 may be electrically coupled to the LED lights 50 to provide on/off, intensity, and other controls of the LED lights 50.

The controller 58 may also be electrically coupled to the ambient light sensor 60. The ambient light sensor 60 may operate to determine an ambient light condition. The ambient light sensor 60 may generate a signal when a threshold ambient light condition is reached. The controller may use the signal generated by the ambient light sensor 60 to automatically reduce an intensity of the LED lights 50 when the ambient light goes below a certain level, and automatically increase an intensity of the LED lights 50 when the ambient light goes above a certain level. In one example, the controller 58 reduces an intensity of the LED lights 50 during night light conditions and increases the intensity during day light conditions.

The controller 58 may be coupled to other electronics, sensors and controls. The controller 58 may operate to receive signals or feedback from these various components and operate either automatically or manually (in response to a user input) to control operation of the LED light assembly 24.

The power connection 62 may provide releasable connection of the LED light assembly 24 to the base 20. The power connectors 62 may be in the form of probes that are inserted into and removed from a portion of the base 20 such as, for example, the electrical connector assembly 32.

A method of assembling the warning whip 10 includes feeding the wiring 18 through the aperture 37 and base 20, connecting the base 20 to the distal end 70 of whip rod 14, electrically connecting the wiring 18 to the electrical connector assembly 32, securing the electrical connector assembly 32 to the base 20, mounting the LED light assembly 24 to the electrical connector assembly 32 to provide an electrical connection between the wiring 18 and the LED light assembly 24, and releasably mounting the lens 22 to the base 20. Additional steps may include permanently mounting the base 20 to the whip rod 14, connecting the lens 22 to the base 20 with a threaded connection, releasably connecting the LED light assembly 24 to the base 20 to provide replacement of the LED light assembly 24, and connecting the LED light assembly 24 to the lens 22 along an internal surface of the lens 22. Any of these example assembly steps may be reordered with or replaced by the other example steps.

Referring now to FIGS. 9-16B, another example warning whip 100 is shown including an LED whip light assembly 112, a whip rod 114, and wiring 18. The warning whip 100 may also include a base connector such as base connector 16 connected to a proximal end portion of whip rod 114.

Figure 11:
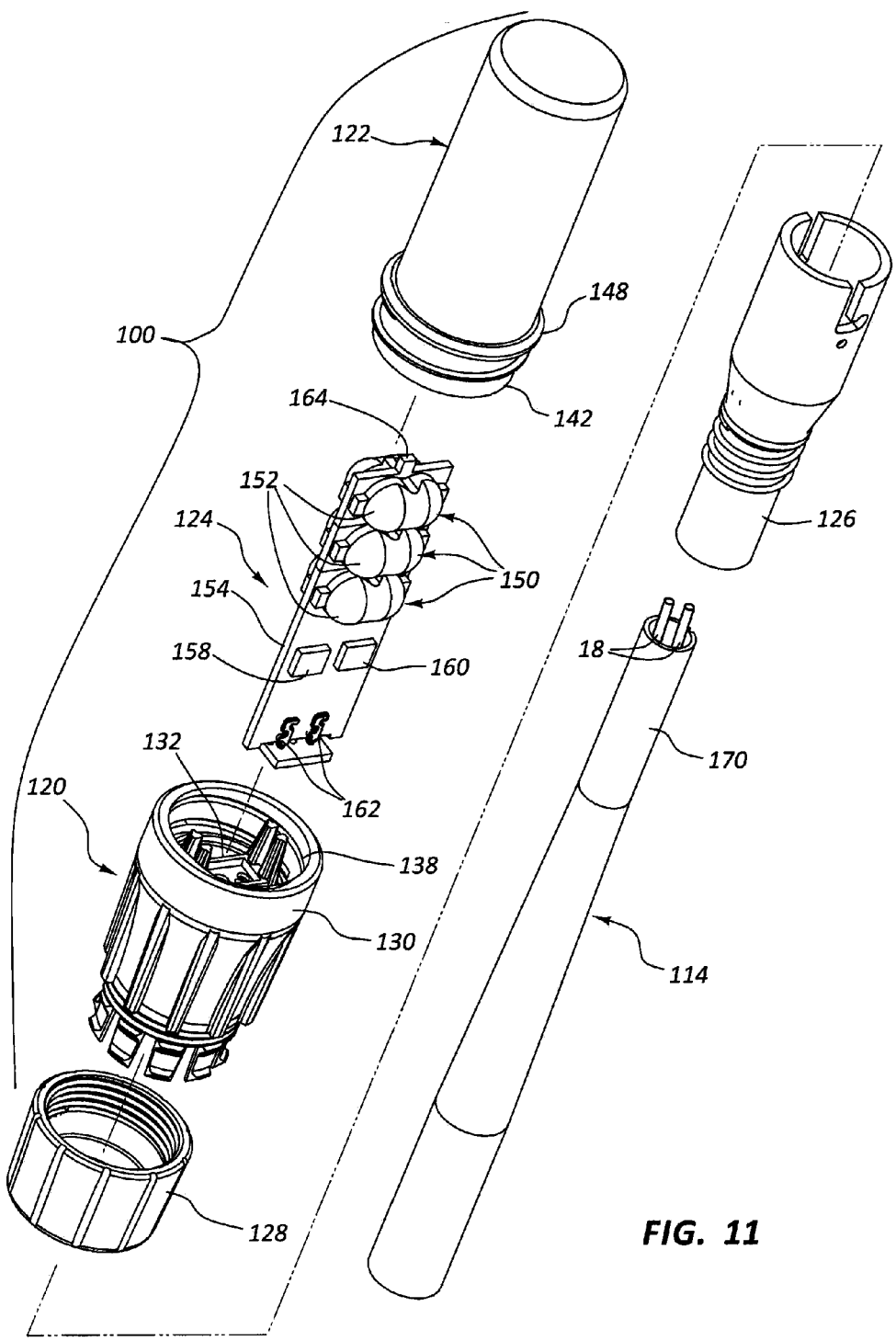
FIG. 11 is an exploded perspective view of the warning whip of FIG. 9.

Referring to FIG. 11, the LED whip light assembly 112 may include a base 120, a lens 122, and an LED light assembly 124. The base 120 may include a base socket 126 that provides an interface between the LED whip light assembly 112 and the whip rod 114. The base socket 126 may be pre-mounted to the whip rod 114, such as when the whip rod 114 with base socket 126 is being retrofit with a different light fixture (i.e., the LED whip light assembly 112). The base socket 126 may be an 1156 light socket as described above. The 1156 light bulb is disconnected from the base socket 126 and the LED whip light assembly 112 mounts directly to the base socket 126 rather than being connected directly to the whip rod 114. In this way, an existing warning whip having an 1156 light socket mounted thereto may be retrofit with the LED whip light assembly 112.

Figure 15A:
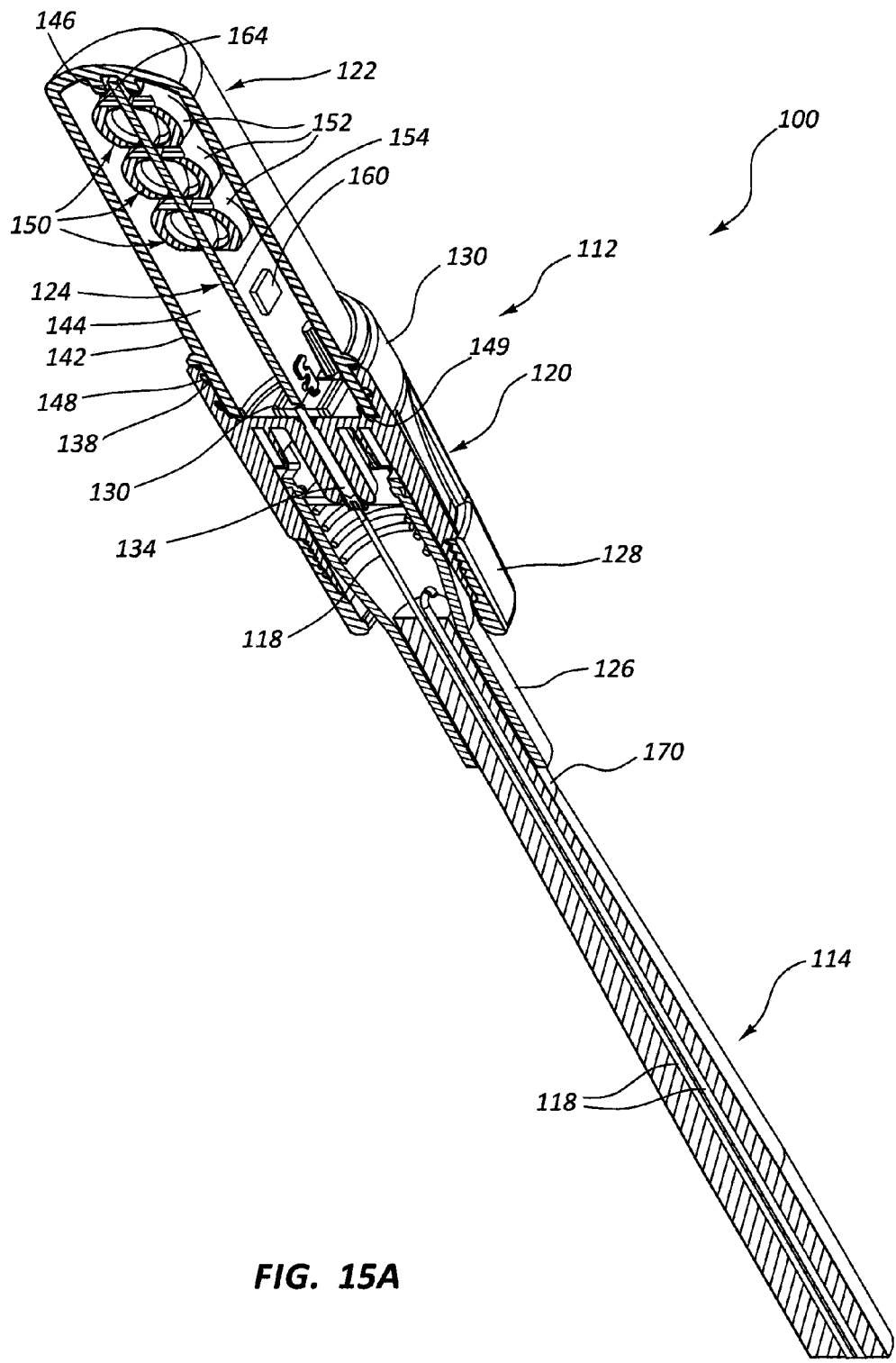
FIG. 15A is a perspective cross-sectional view of the warning whip of FIG. 9.

The base 120 may also include a locking base portion 128, a lens receiving portion 130, an electrical connector assembly 132, and wiring connectors 134 (see FIGS. 15A-16B). The lens receiving portion 130 includes a plurality of internal threads 138 sized to mate with connecting threads of the lens 122. The lens receiving portion 130 extends over an exterior of the base socket 126 as shown in FIGS. 15A and 15B. The locking base portion 128 is then threaded onto the lens receiving portion 130. At least one of the locking base portion 128 and lens receiving portion 130 includes a tapered portion such that threading the locking base portion 128 onto the lens receiving portion 130 applies a radially inward directed force that tightens the lens receiving portion 130 around the base socket 126. This tightening provides a firm connection between lens receiving portion 130 and the base socket 126 and releasably locks the receiving portion 130 to the base socket 126.

The hot member of wiring 118 extends through the whip rod 114 and into electrical connection with the electrical connector assembly 132. A ground member of the wiring 118 is captured between an outer surface of the whip rod 114 and an inner surface of the base socket 126 as shown in, for example, FIG. 16A. The electrical connector assembly 132 is coupled to both of the base socket 126 and the wiring connector 134 as shown in, for example, FIGS. 15A and 16A. The LED light assembly 24 is then connected to the electrical connector assembly 132 to provide power to the LED light assembly 124.

The lens 22 includes distal and proximal ends 140, 142, an internal cavity 144, a board connection portion 146, a plurality of external threads 148, and a sealing member 149. The board connection portion 146 is positioned within the internal cavity 144 adjacent to the distal end 140 (see FIG. 15A). The threads 148 are positioned at the proximal end 142 and arranged for threadable contact with the threads 138 of base 120. The internal cavity 144 is sized to enclose the LED light assembly 124. The sealing member 149 may be positioned at the proximal end 142 and arranged for sealing contact with the base 120. The sealing member 149 may provide a liquid-tight seal with base 120 such that the LED whip light assembly 112 is waterproof. Alternatively, the sealing member 149 may be carried by the base 120 in the lens receiving portion 130 and arranged for contact by the lens 122 to provide the liquid-tight seal.

The lens 122 may have a variety of different colors, shapes and sizes to provide a desired light output from the LED whip light assembly 112. The lens 122 may have a permanent connection with the base 120. Alternatively, the lens 122 may have a releasable connection with base 120 such that the lens 122 may be replaceable and the LED light assembly 124 accessible for replacement.

Figure 15B:
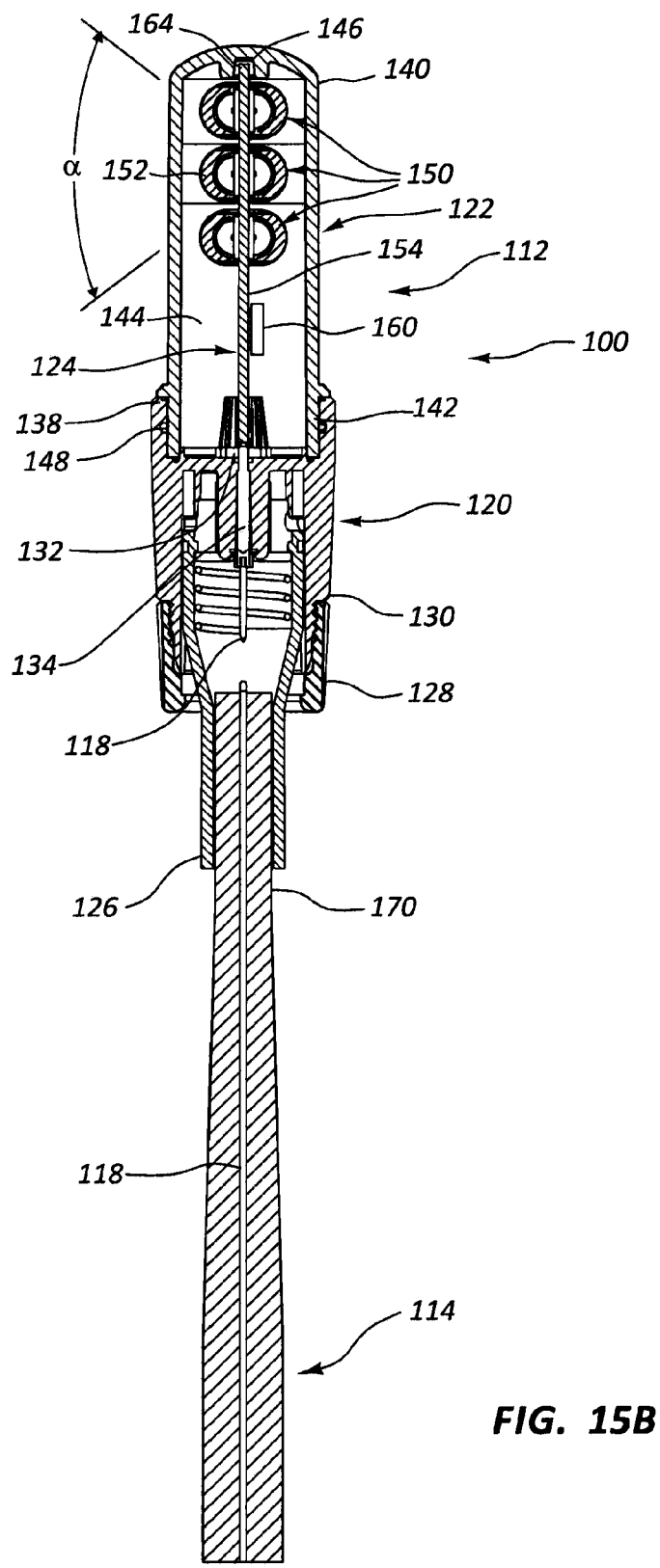
FIG. 15B is a plan view of the cross-section shown in FIG. 15A.
Figure 16A:
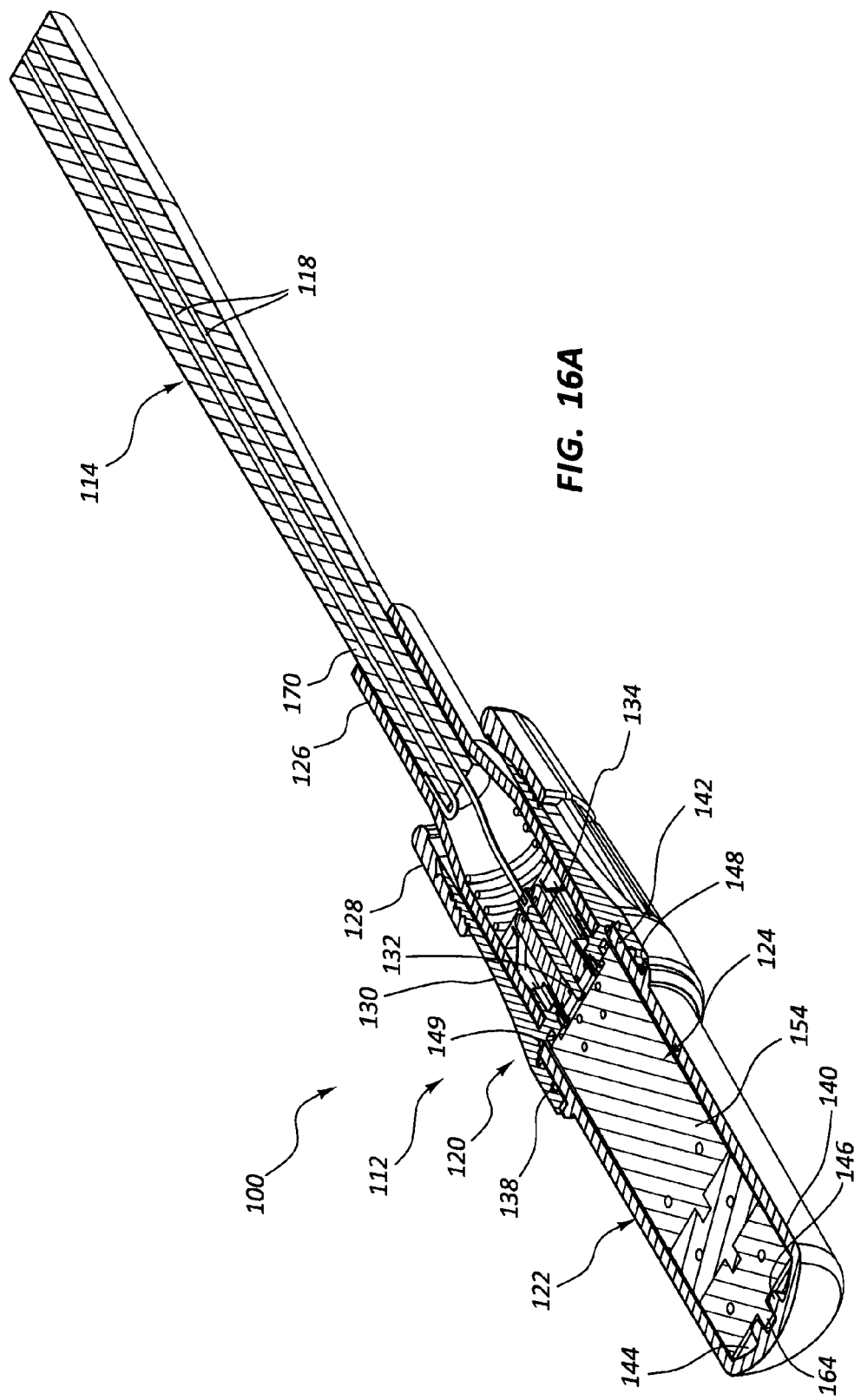
FIG. 16A is another perspective cross-sectional view of the warning whip of FIG. 9.
Figure 16B:
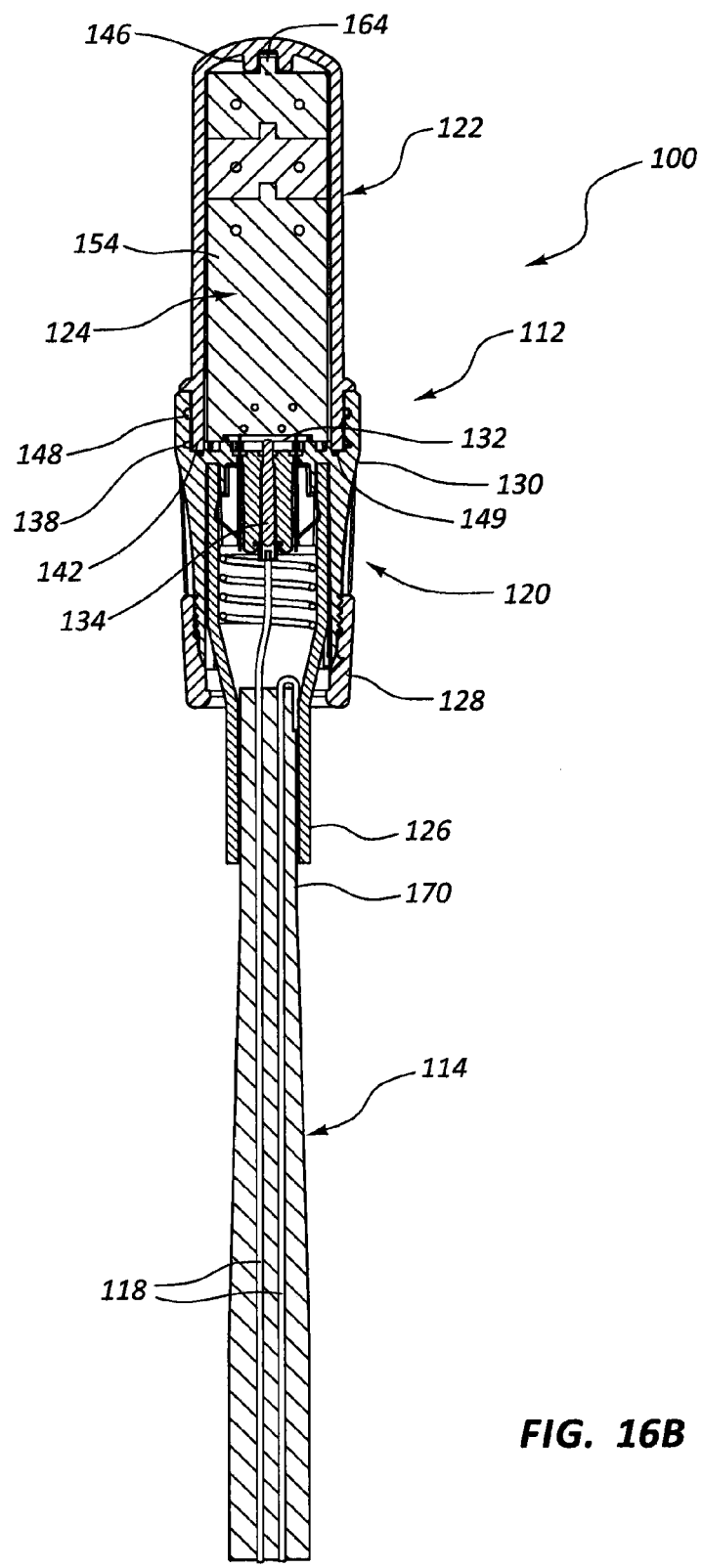
FIG. 16B is a plan view of the cross-section shown in FIG. 16A.

The LED light assembly 124 includes a plurality of LED lights 150, a printed circuit board 154 having a lens connector 164, a controller 158, an ambient light sensor 160, and power connectors 162. Like the LED lights 50 of LED light assembly 24 described above, any desired number, type, and orientation is possible for the LED lights 150 on the printed circuit board 154. Each of the LED lights 150 may include optics 152. The optics 152 may cover or surround an LED. The optics 152 may limit an output angle for the light emanating from LED lights 150. FIG. 15B shows a reduced angle $\alpha$ in the vertical direction for light output from LED lights 150. Typically, the angle $\alpha$ is in the range as described above with reference to LED light assembly 24. Optics 152 may also restrict light in a horizontal direction within a range of angles described above with reference to LED lights 50.

The controller 158 and ambient light sensor 160 may have similar functionality as described above with reference to LED light assembly 24. The lens connector 164 of the printed circuit board 154 may extend into and contact the board connection portion 146 of lens 122 (see FIG. 15A). The lens connector 164 may orient the LED light assembly 124 within the lens 122. The lens 122 may rotate relative to the LED light assembly 124 while maintaining contact with the lens connector 164.

The power connectors 162 may provide an electrical connection between the LED light assembly 124 and the base 120 and associated wiring 118. The power connectors 162 may be in the form of, for example, probes that extend into and connect with a receiver such as, for example, the electrical connector assembly 132. The power connectors 162 may have any desired shape, size and orientation.

The LED light assembly 124 may be replaceable with LED light assemblies having a different configuration of LED lights 150 to customize the warning whip 100. The LED light assembly may have any desired combination of total number of LED lights 50, LED lights of certain intensity, color, optic angle, orientation, or number of LED lights on opposing sides of the printed circuit board. An operator may easily replace the LED light assembly 124 by removing the lens 122, disconnecting the LED light assembly 124 from the base 120, and replacing the LED light assembly 124 with a different LED light assembly, followed by replacing the lens 122.

Similarly, the entire LED whip light assembly 112 may be removed or replaced on the whip rod 114 by unthreading the locking base portion 128, which releases the lens receiving portion 130 from the base socket 126. The hot wire of the wiring 118 may be disconnected from the wiring connector 134. In at least some examples, the wiring connector 134 provides a releasable connection with the hot wire of wiring 118 for easy disconnection. In other examples, a solder or other permanent connection is provided between wiring connector 134 and the hot wire of wiring 118. Once the hot wire of wiring 118 is disconnected from the wiring connector 134, the entire LED whip light assembly 112 is removed and can be repaired and reconnected, or replaced with a different LED whip light assembly. The ground wire of wiring 118 may remain connected to base socket 126 while the LED whip light assembly 112 is disconnected from the whip rod 114.

In one embodiment, the LED lights included in the LED whip light assembly have a power rating in the range of about 0.5 Watts to about 2 Watts, and preferably about 1 Watt. The LED lights may have an output of about 50 lumens to about 200 lumens, and more preferably about 130 lumens. The LED lights may have any desired color, although white is typically used. The optics of the LED lights may have any desired optic degree. In one embodiment, the optic degree is about 85°×

150° (vertical×horizontal). In another example, the optical degree is about 65°×135° (vertical×horizontal).

The controller 58 may include a microprocessor. An example microprocessor is a 12-24V microprocessor controlled Buck converter. The microcontroller may operate in the range of about 70% to about 95% efficiency, and preferably about 90% efficiency.

The ambient light sensor may comprise a phototransistor. The controller may be circuit programmable. The controller may include a plurality of modes, light schemes or programs. For example, the controller may provide a strobe light mode, a constant "on: mode, or various flashing modes with different intervals or flashing sequences.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of assembling a light emitting diode (LED) whip light assembly, comprising:
   providing a base, an LED light assembly comprising a plurality of LED lights and control circuitry, and a lens;
   connecting the base to an elongate whip rod with a liquid-tight connection;
   releasably connecting the LED light assembly to the base;
   covering the LED light assembly with the lens and releasably connecting the lens to the base with a liquid-tight connection.

2. The method of claim 1, wherein the base comprises first and second portions, the first portion being connected to the elongate whip rod with a liquid-tight connection, and the second portion being releasably connected to the first portion with a liquid-tight connection.

3. The method of claim 1, wherein releasably connecting the lens to the base includes rotating the lens relative to the base.

4. The method of claim 1, wherein releasably connecting the LED light assembly comprises inserting at least one power prong of the LED light assembly into a power receiver of the base.

5. The method of claim 1, wherein connecting the base to the elongate whip rod comprises providing at least one of an interference fit connection, an adhesive bond connection, a weld connection, and a threaded connection.

* * * * *